US009438520B2

(12) United States Patent
Patel et al.

(10) Patent No.: US 9,438,520 B2
(45) Date of Patent: Sep. 6, 2016

(54) SYNCHRONIZING STATE AMONG LOAD BALANCER COMPONENTS

(71) Applicant: MICROSOFT TECHNOLOGY LICENSING, LLC, Redmond, WA (US)

(72) Inventors: Parveen Patel, Redmond, WA (US); Volodymyr Ivanov, Dublin (IE); Marios Zikos, Alexandroupolis (GR); Vladimir Petter, Bellevue, WA (US); Vyacheslav Kuznetsov, Sammamish, WA (US); David Allen Dion, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 14/546,729

(22) Filed: Nov. 18, 2014

(65) Prior Publication Data

US 2015/0063115 A1    Mar. 5, 2015

Related U.S. Application Data

(63) Continuation of application No. 14/198,465, filed on Mar. 5, 2014, now abandoned, which is a continuation of application No. 12/972,340, filed on Dec. 17, 2010, now Pat. No. 8,755,283.

(51) Int. Cl.
*H04L 12/803*    (2013.01)
*H04L 12/26*    (2006.01)
(Continued)

(52) U.S. Cl.
CPC ......... *H04L 47/125* (2013.01); *H04L 43/0876* (2013.01); *H04L 45/22* (2013.01); *H04L 47/11* (2013.01)

(58) Field of Classification Search
CPC ..... H04L 47/125; H04L 47/11; H04L 45/22; H04L 43/0876; H04L 67/10; H04L 67/1002; H04L 67/1034; H04L 67/1029; H04L 47/10; H04L 69/40; H04L 12/24; H04L 41/00; H04L 29/08261; H04L 29/0827; H04L 29/08279; H04L 29/08738; H04L 47/726; H04L 45/021; H04L 45/023; H04L 29/08144; H04L 29/08153; G06F 9/5083
See application file for complete search history.

(56) References Cited

U.S. PATENT DOCUMENTS

| 5,371,852 A | 12/1994 | Attanasio et al. |
| 5,774,660 A | 6/1998 | Brendel et al. |

(Continued)

FOREIGN PATENT DOCUMENTS

| CN | 1578320 A | 2/2005 |
| JP | 2002288038 A | 10/2002 |
| JP | 2011041006 | 2/2011 |

OTHER PUBLICATIONS

Office Action dated Sep. 3, 2015 cited in U.S. Appl. No. 14/198,465.
(Continued)

*Primary Examiner* — Pao Sinkantarakorn
*Assistant Examiner* — Michael Phillips
(74) *Attorney, Agent, or Firm* — Ben Tabor; Doug Barker; Micky Minhas

(57) ABSTRACT

The present invention extends to methods, systems, and computer program products for synchronizing state among load balancer components. Embodiments of the invention include load balancers using a consistent hashing algorithm to decide how new connections should be load balanced. Use of consistent hashing algorithm permits load balancers to work in a stateless manner in steady state. Load balancers start keeping flow state information (destination address for a given flow) about incoming packets when it is needed, i.e. such as, for example, when a change in destination host configuration is detected. State information is shared across load balancers in a deterministic way, which allows knowing which load balancer is authoritative (e.g., is the owner) for a given flow. Each load balancer can reach the authoritative load balancer to learn about a flow that cannot be determined locally.

20 Claims, 9 Drawing Sheets

(51) Int. Cl.
*H04L 12/707* (2013.01)
*H04L 12/801* (2013.01)

(56) References Cited

U.S. PATENT DOCUMENTS

| | | | |
|---|---|---|---|
| 6,061,349 A | 5/2000 | Coile et al. | |
| 6,070,191 A | 5/2000 | Narendran | |
| 6,351,775 B1 | 2/2002 | Yu | |
| 6,704,278 B1 | 3/2004 | Albert et al. | |
| 7,280,557 B1 | 10/2007 | Biswas et al. | |
| 7,512,702 B1 | 3/2009 | Srivastava et al. | |
| 7,567,504 B2 | 7/2009 | Darling et al. | |
| 7,590,736 B2 | 9/2009 | Hydrie et al. | |
| 7,613,822 B2 | 11/2009 | Joy | |
| 7,685,109 B1 | 3/2010 | Ransil | |
| 7,693,050 B2* | 4/2010 | Achlioptas | H04L 45/745 370/229 |
| 8,112,545 B1 | 2/2012 | Ong | |
| 8,128,279 B2 | 3/2012 | Pryor et al. | |
| 8,274,989 B1 | 9/2012 | Allan et al. | |
| 8,514,878 B1 | 8/2013 | Allan et al. | |
| 8,645,508 B1 | 2/2014 | Dickinson et al. | |
| 2001/0034752 A1 | 10/2001 | Kremien | |
| 2002/0032755 A1 | 3/2002 | Abrahams et al. | |
| 2002/0040402 A1 | 4/2002 | Levy-Abegnoli et al. | |
| 2003/0005080 A1 | 1/2003 | Watkins et al. | |
| 2003/0097405 A1 | 5/2003 | Laux et al. | |
| 2003/0105903 A1* | 6/2003 | Garnett | G06F 1/183 710/300 |
| 2003/0156535 A1* | 8/2003 | Lebizay | H04L 12/5693 370/229 |
| 2003/0202536 A1 | 10/2003 | Foster et al. | |
| 2004/0024853 A1 | 2/2004 | Cates et al. | |
| 2004/0109447 A1 | 6/2004 | Douglass et al. | |
| 2004/0117794 A1 | 6/2004 | Kundu | |
| 2004/0162914 A1 | 8/2004 | St. Pierre et al. | |
| 2005/0055435 A1 | 3/2005 | Gbadegesin et al. | |
| 2005/0097185 A1 | 5/2005 | Gibson et al. | |
| 2005/0132030 A1 | 6/2005 | Hopen et al. | |
| 2005/0149531 A1 | 7/2005 | Srivastava | |
| 2005/0188055 A1 | 8/2005 | Saletore | |
| 2005/0198238 A1 | 9/2005 | Sim et al. | |
| 2005/0232274 A1* | 10/2005 | Kadambi | H04L 47/125 370/392 |
| 2005/0249199 A1 | 11/2005 | Albert et al. | |
| 2005/0261985 A1 | 11/2005 | Miller et al. | |
| 2006/0002292 A1* | 1/2006 | Chang | H04L 12/462 370/225 |
| 2006/0123416 A1 | 6/2006 | Cibrario Bertolotti et al. | |
| 2006/0206658 A1 | 9/2006 | Hendel et al. | |
| 2006/0294584 A1 | 12/2006 | Sundaram | |
| 2007/0055789 A1 | 3/2007 | Claise et al. | |
| 2007/0124476 A1 | 5/2007 | Oestereicher et al. | |
| 2007/0165622 A1 | 7/2007 | O'Rourke et al. | |
| 2008/0008202 A1* | 1/2008 | Terrell | H04L 12/5693 370/401 |
| 2008/0104273 A1 | 5/2008 | Bruck et al. | |
| 2008/0183854 A1 | 7/2008 | Hopen et al. | |
| 2008/0201540 A1 | 8/2008 | Sahita et al. | |
| 2008/0259917 A1 | 10/2008 | Hua | |
| 2008/0288941 A1 | 11/2008 | Adams et al. | |
| 2010/0036903 A1 | 2/2010 | Ahmad | |
| 2010/0036954 A1 | 2/2010 | Sakata et al. | |
| 2010/0057898 A1 | 3/2010 | Imai | |
| 2010/0095008 A1 | 4/2010 | Joshi | |
| 2010/0218254 A1 | 8/2010 | Gray et al. | |
| 2010/0268764 A1 | 10/2010 | Wee et al. | |
| 2010/0302940 A1 | 12/2010 | Patel et al. | |
| 2010/0322088 A1 | 12/2010 | Muthiah et al. | |
| 2010/0322250 A1 | 12/2010 | Shetty et al. | |
| 2011/0225231 A1 | 9/2011 | Bansal et al. | |
| 2011/0235508 A1 | 9/2011 | Goel et al. | |
| 2011/0267947 A1 | 11/2011 | Dhar et al. | |
| 2011/0276695 A1 | 11/2011 | Maldaner | |
| 2012/0099601 A1 | 4/2012 | Haddad et al. | |
| 2012/0207174 A1 | 8/2012 | Shieh | |
| 2012/0246637 A1 | 9/2012 | Kreeger et al. | |
| 2012/0303809 A1 | 11/2012 | Patel et al. | |
| 2013/0148505 A1 | 6/2013 | Koponen et al. | |
| 2013/0159487 A1 | 6/2013 | Patel et al. | |
| 2013/0301413 A1 | 11/2013 | Moen et al. | |
| 2014/0006681 A1 | 1/2014 | Chen et al. | |
| 2014/0019602 A1 | 1/2014 | Murthy et al. | |
| 2014/0029430 A1 | 1/2014 | Samuels et al. | |
| 2014/0351395 A1 | 11/2014 | Murthy et al. | |
| 2016/0026505 A1 | 1/2016 | Murthy et al. | |

OTHER PUBLICATIONS

Notice of Allowance dated Feb. 10, 2016 cited in U.S. Appl. No. 14/804,381.
Second Office Action Issued in Chinese Patent Application No. 201110444322.1, Mailed Date: Apr. 9, 2015, 6 Pages.
Notice of Allowance dated Mar. 24, 2015 cited in U.S. Appl. No. 14/452,314.
First Office Action Received for Chinese Application No. 201110444322.1, Mailed Date: Sep. 3, 2014, 12 Pages.
U.S. Appl. No. 14/198,465, Dec. 5, 2014, Office Action.
Greenberg, et al., "Towards a Next Generation Data Center Architecture: Scalability and Commoditization", In Proceedings of the ACM Workshop on Programmable Routers for Extensible Services of Tomorrow, Aug. 22, 2008, pp. 57-62.
Alur, Sanjeev J., "Enterprise Integration and Distributed Computing: A Ubiquitous Phenomenon", Published: Dec. 27, 2008. Available at: http://msdn.microsoft.com/en-us/library/cc949110.aspx.
Joseph, et al., "A Policy-Aware Switching Layer for Data Centers", In Proceedings of the ACM SIGCOMM Conference on Data Communication, Aug. 17, 2008, pp. 51-62.
Al-Fares, et al., "Hedera: Dynamic Flow Scheduling for Data Center Networks", In Proceedings of the 7th USENIX Conference on Networked Systems Design and Implementation, Apr. 28, 2010, pp. 281-295.
Stage, et al., "Network-aware Migration Control and Scheduling of Differentiated Virtual Machine Workloads", In Workshop on Software Engineering Challenges in Cloud Computing, May 23, 2009, pp. 9-14.
"Load Balancing: Optimum Performance, Scalability and Resiliency", Available at least as early as Apr. 20, 2012, available at: http://www.contegix.com/solutions/managed-hosting/managed-services/load-balancing/.
Nehra, Neeraj, et al., "A Framework for Distributed Dynamic Load Balancing in Heterogeneous Cluster", Journal of Computer Science 3 (1): Jan. 2007 Science Publications, pp. 14-24.
Bunt, Richard B., et al., "Achieving Load Balance and Effective Caching in Clustered Web Servers", Proceedings of the Fourth International Web Caching Workshop, San Diego, CA, Apr. 1999, pp. 159-169.
K2 Colocation, Network Load Balancing Appliance, Intelligent Routing Network Appliance, "Flow Control Platform (FCP) Solutions", Jan. 4, 2007, 2 pages.
White Paper, Equalizer, "Purpose-Built Load Balancing the Advantages of Coyote Point Equalizer over Software-based Solutions", Copyright 2004 Coyote Point Systems, Inc. 9 pages. (The month of Publication is irrelevant since the year of Publication is clearly prior to the filing of the Application).
Microsoft TechNet, "MS Windows NT Load Balancing Service Whitepaper", Based on information and belief available, at least as early as Jul. 27, 2010, 9 pages.
HAProxy, "The Reliable, High Performance TCP/HTTP Load Balancer", Jun. 16, 2010, 10 pages.
Top Web Hosting, "Load Balancing", Copyright 2002-2010, Based on information and belief available ast least as early as Jul. 27, 2010, 6 pages.
Linux.com, Walcott, Costa, "Taking a load off: Load balancing with balance", Aug. 17, 2005, 7 pages.
InfoBPN Solutions on Business Process Networking Business and Process Automation, "Application Load Balancing Solution", Based on information and belief available, at least as early as Jul. 27, 2010.

(56) References Cited

OTHER PUBLICATIONS

U.S. Appl. No. 13/547,805, Jan. 3, 2014, Office Action.
U.S. Appl. No. 12/972,340, Feb. 25, 2013, Office Action.
U.S. Appl. No. 12/972,340, Dec. 18, 2013, Notice of Allowance.
U.S. Appl. No. 13/115,444, Apr. 15, 2013, Office Action.
U.S. Appl. No. 13/115,444, Sep. 13, 2013, Office Action.
U.S. Appl. No. 13/115,444, Jan. 30, 2014, Office Action.
U.S. Appl. No. 12/972,340, Feb. 14, 2014, Notice of Allowance.
U.S. Appl. No. 13/547,805, Apr. 14, 2014, Notice of Allowance.

* cited by examiner (Steady State)

(Removal)

(Replacement)

(Addition During Transition Period)

(MUX Failure)

SYNCHRONIZING STATE AMONG LOAD BALANCER COMPONENTS

CROSS-REFERENCE TO RELATED APPLICATIONS

This application is a continuation of U.S. patent application Ser. No. 14/198,465 filed on Mar. 5, 2014, entitled "SYNCHRONIZING STATE AMONG LOAD BALANCER COMPONENTS," now abandoned, which is a continuation of U.S. patent application Ser. No. 12/972,340 filed on Dec. 17, 2010, entitled "SYNCHRONIZING STATE AMONG LOAD BALANCER COMPONENTS," which issued as U.S. Pat. No. 8,755,283 on Jun. 17, 2014, and which applications are incorporated herein by reference in their entireties.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In distributed computing systems, distributed load balancers are often used to share processing load across a number of computer systems. For example, a plurality of load balancers can be used to receive external communication directed to a plurality of processing endpoints. Each load balancer has some mechanism to insure that all external communication from the same origin is directed to the same processing endpoint.

For load balancers to make accurate decisions on where to direct external communication (e.g., to which processing endpoint), load balancers share state with one another. For example, a decision made at one load balancer for communication for specified origin can be synchronized across other load balancers. Based on the synchronized state, any load balancer can then make an accurate decision with respect to sending communication from the specified origin to the same processing endpoint.

Unfortunately, to maintain synchronized state among a plurality of load balancers, significant quantities of data often need to be exchanged between the plurality of load balancers. As a result, synchronizing state among load balancers becomes a bottleneck and limits the scalability of load balancers.

BRIEF SUMMARY

The present invention extends to methods, systems, and computer program products for synchronizing state among load balancer components. In some embodiments, a load balancer receives a packet from a router. The packet contains source electronic address information identifying a source on the wide area network and destination electronic address information including a virtual electronic address. The load balancer uses an algorithm to generate a data flow identifier for the existing data flow from the source electronic address information and the destination electronic address information. The load balancer determines that the packet is for an existing data flow.

The load balancer determines that the load balancer lacks sufficient information to identify a destination host, from among a plurality of destination hosts, that corresponds to the existing data flow. This includes the load balancer not having cached state that maps the existing data flow to one of the destination hosts in the plurality of destination hosts.

In response to the determination, the load balancer identifies an owner load balancer that is designated as the owner of the existing data flow. Also in response to the determination, the load balancer sends a request for data flow state information to the owner load balancer. The load balancer receives state information from the owner load balancer. The state information identifies the destination host that corresponds to the existing data flow. The load balancer caches the received state information.

On subsequent packets in this data flow, the load balancer sends a message back to the owner load balancer to indicate the continuation of the data flow. This continuation message needs only be sent once per idle timeout interval. The idle timeout interval determines how long a data flow retains its mapping to the same destination host even in absence of any packets.

The load balancer determines that the received packet is for an existing data flow. The load balancer determines that the load balancer is not the owner of the existing data flow. The load balancer determines that the load balancer has cached state for the existing data flow. The cached state maps the existing data flow to one of the destination hosts in the plurality of destination hosts. The load balancer sends the received packet to the destination host mapped to the existing data flow. The load balancer determines whether it needs to send data flow continuation message to the owner load balancer. The load balancer sends the cached state to the owner load balancer.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
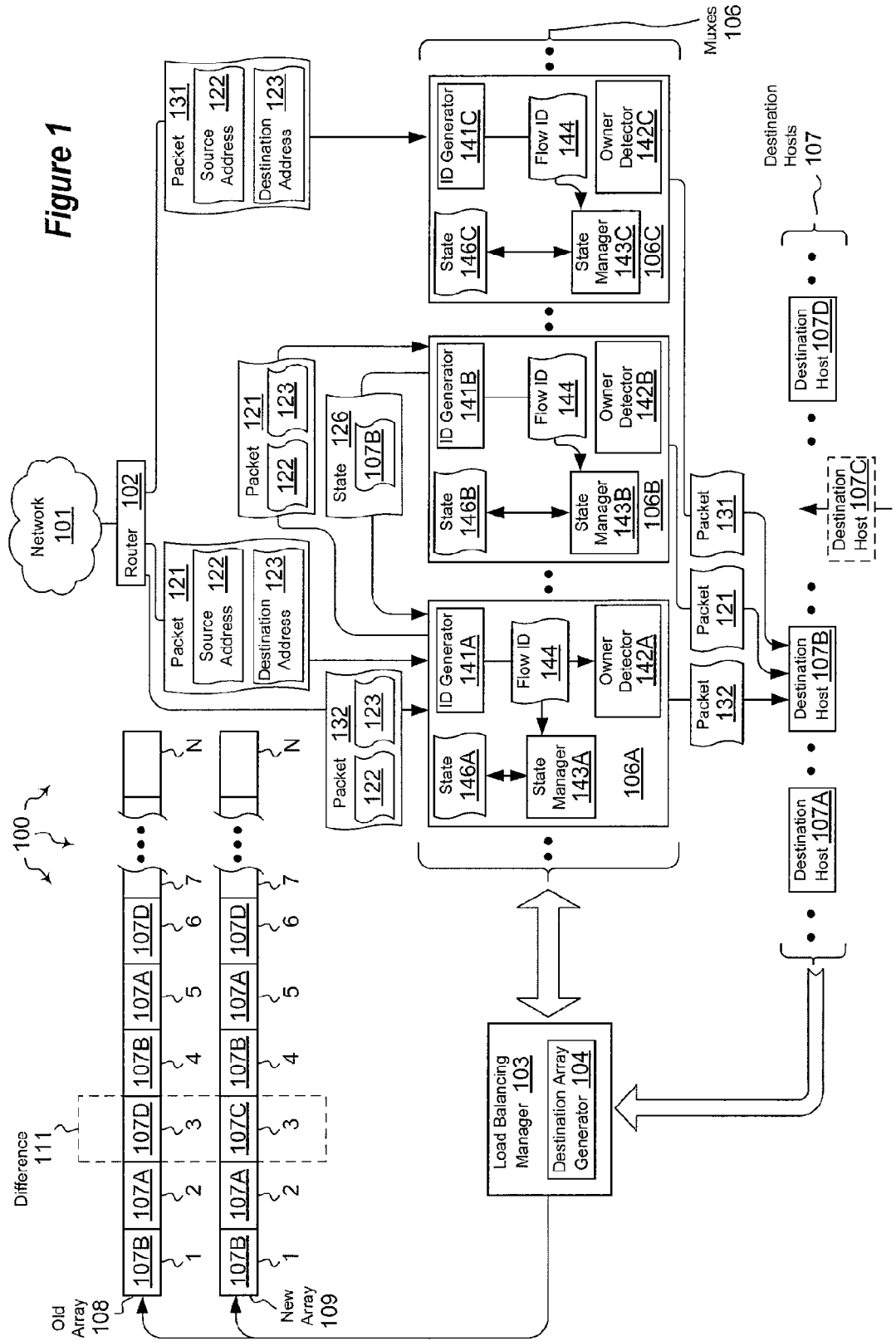
FIG. 1 illustrates an example computer architecture that facilitates synchronizing state among load balancer components.

The present invention extends to methods, systems, and computer program products for synchronizing state among load balancer components. In some embodiments, a load balancer receives a packet from a router. The packet contains source electronic address information identifying a source on the wide area network and destination electronic address information including a virtual electronic address. The load balancer uses an algorithm to generate a data flow identifier for the existing data flow from the source electronic address information and the destination electronic address information. The load balancer determines that the packet is for an existing data flow.

The load balancer determines that the load balancer lacks sufficient information to identify a destination host, from among a plurality of destination hosts, that corresponds to the existing data flow. This includes the load balancer not having cached state that maps the existing data flow to one of the destination hosts in the plurality of destination hosts.

In response to the determination, the load balancer identifies an owner load balancer that is designated as the owner of the existing data flow. Also in response to the determination, the load balancer sends a request for data flow state information to the owner load balancer. The load balancer receives state information from the owner load balancer. The state information identifies the destination host that corresponds to the existing data flow. The load balancer caches the received state information.

On subsequent packets in this data flow, the load balancer sends a message back to the owner load balancer to indicate the continuation of the data flow. This continuation message needs only be sent once per idle timeout interval. The idle timeout interval determines how long a data flow retains its mapping to the same destination host even in absence of any packets.

The load balancer determines that the received packet is for an existing data flow. The load balancer determines that the load balancer is not the owner of the existing data flow. The load balancer determines that the load balancer has cached state for the existing data flow. The cached state maps the existing data flow to one of the destination hosts in the plurality of destination hosts. The load balancer sends the received packet to the destination host mapped to the existing data flow. The load balancer determines whether it needs to send data flow continuation message to the owner load balancer. The load balancer sends the cached state to the owner load balancer.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates synchronizing state among load balancer components. Referring to FIG. 1, computer architecture 100 includes router 102, load balancing manager 103, multiplexers ("muxes") 106, and destination hosts 107. Each of the depicted computer systems is connected to one another over (or is part of) a network, such as, for example, a Local Area Network ("LAN") and/or a Wide Area Network ("WAN"). Router 102 is further connected to network 101. Network 101 can be a further WAN, such as, for example, the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the described networks.

Generally, router 102 interfaces between network 101 and other components of computer architecture 101 to appropriately route packets between network 101 and the other components of computer architecture 100. Router 102 can be configured to receive messages from network 101 and forward those messages to appropriate components of computer architecture 100. For example, router 102 can be configured to forward IP traffic for Virtual Internet Protocol Addresses ("VIPs") to IP addresses of the physical interfaces at muxes 106. Router 102 can support Equal Cost Multi-Path ("ECMP") routing to virtually any number (e.g., 4, 8, 16, etc.) of IP addresses. Accordingly, a plurality of muxes 106 can be configured as active muxes. In other embodiments, (e.g., when ECMP is not supported), one mux can be configured as an active mux and zero or more other muxes configured as stand-by muxes.

In further embodiments, a Domain Name Services ("DNS") round robin approach is used. One or more VIPs are assigned to and shared between a plurality of muxes 106. A Domain Name Services ("DNS") name is registered to resolve the one or more VIPs. If a mux 106 fails, the VIPs it owns are failed over to other muxes 106.

In additional embodiments, a VIP is configured on the network interface card for each mux. One of the muxes (e.g., a master node) is set to respond to Address Resolution Protocol ("ARP") requests for the VIP. Thus, router 102 can send any packets for the VIP to the master node. The master node can then perform Layer 2 forwarding based on current state and/or load balancer rules. Use of a "master node" can mitigate flooding and is much cheaper than Layer 3 forwarding.

As depicted, muxes 106 include a plurality of muxes including muxes 106A, 106B, and 106C. Destination hosts 107 include a plurality destination hosts includes destination hosts 107A, 107B, and 107D. Generally, each mux 106 is configured to receive a packet, identify the appropriate destination host for the packet, and forward the packet to the appropriate destination host. In some embodiments, an appropriate destination host 107 for a packet is identified from one or more of: the contents of the packet, cached state at a receiving mux, cached state at other muxes, whether the packet is for an existing data flow or a new data flow, and the configuration of destination hosts 107.

Each mux includes an ID generator, an owner detector, and a state manager. For example, muxes 106A, 106B, and 106C include ID generators 141A, 141B, 141C, owner detectors 142A, 142B, and 142C, and state managers 143A, 143B, and 143C respectively. Each ID generator is configured to generate a data flow ID for a packet based on the contents of the packet. In some embodiments, a 5-tuple of (source IP:port, VIP:port, IP protocol) is used to represent and/or generate a data flow ID. In other embodiments, a subset of this 5-tuple may be used. A new data flow ID can be mapped to a destination host 107 identified, for example, by (Destination Host IP:port). A corresponding state manager can cache state mapping a data flow ID and (Destination Host IP:port). Thus, when further packets having the same flow ID are received, the mux can refer to the cached state to identify the appropriate destination host 107 for each of the further packets.

In some embodiments, different portions of a data flow ID space are "owned" by different muxes. An owner detector at each mux is configured to determine the owner mux for a data flow ID. Then owner detector can receive a data flow ID as input and return the IP address for the owner mux as output. Thus, each mux can send state to and/or request state from an owner mux for each data flow ID. For example, when a mux identifies an appropriate destination host for a data flow ID, the mux can (in addition to also caching) forward the appropriate destination host to the owner mux for the data flow ID. On the other hand, when a mux lacks sufficient information to identify an appropriate destination host for a data flow ID, the mux can query the owner mux to obtain the appropriate destination host.

In some embodiments, when a mux lacks sufficient information to identify the appropriate destination host for a packet corresponding to a data flow ID, the mux sends the packet to the owner mux for the data flow ID. In response to receiving the packet, the owner mux determines the appropriate destination host for the data flow ID. Also, the owner mux sends cached state (either generated at the owner mux or received from further other muxes) mapping the data flow ID to the appropriate destination host to the mux.

In other embodiments, when a mux lacks sufficient information to identify the appropriate destination host for a data flow ID, the mux sends an express request for cached state to the owner mux for the data flow ID. In response to receiving the express request, the owner mux sends cached state (either generated at the owner mux or received from further other muxes) mapping the data flow ID to the appropriate destination host to the mux. The mux then sends the packet to the appropriate destination host.

Generally, load balancing manager 103 is configured to monitor the arrangement of destination hosts 107 for transitions (e.g., when a new destination host is being added). Destination array generator 104 can, from time to time, formulate (e.g., using a hashing function) an array that maps data flow IDs to destination hosts. Load balancing manger 103 can maintain two versions of the array, a current version of the array (e.g., new array 109) and the immediate previous version of the array (e.g., old array 108). The positions within the array can correspond to data flow IDs. For example, array position 1 can correspond to data flow ID 1, etc. Thus, as indicated in arrays 108 and 109 the destination host 107B is the appropriate destination host for data flow ID 1.

Load balancing manager 103 can communicate the two versions of the array to muxes 106. When the arrangement of destination hosts 107 is in a steady state, mappings in the current and immediate previous versions of the array match. As such, in steady state, a mux 106 can refer to the mappings to determine where to send a packet for a specified data flow ID (even when the mux lacks cached state).

On the other hand, when the arrangement of destination hosts 107 is in transition (e.g., when a new destination host 107 is being added), mappings in the current and immediate previous versions of the array differ. For example, when a new destination host 107 is added, the data flow ID space can be spread across more destination hosts 107 to reduce the load on individual destination hosts 107. For example, difference 111 indicates that a portion of the data flow ID space previously corresponding to destination host 107D (e.g., data flow ID 3) now corresponds to destination host 107C. To increase the likelihood of packets for existing data flows continuing to the same destination host, muxes 106 can refer to cached state (either locally or queried from an owner mux) when the arrangement of destination hosts 107 is in transition.

Figure 2:
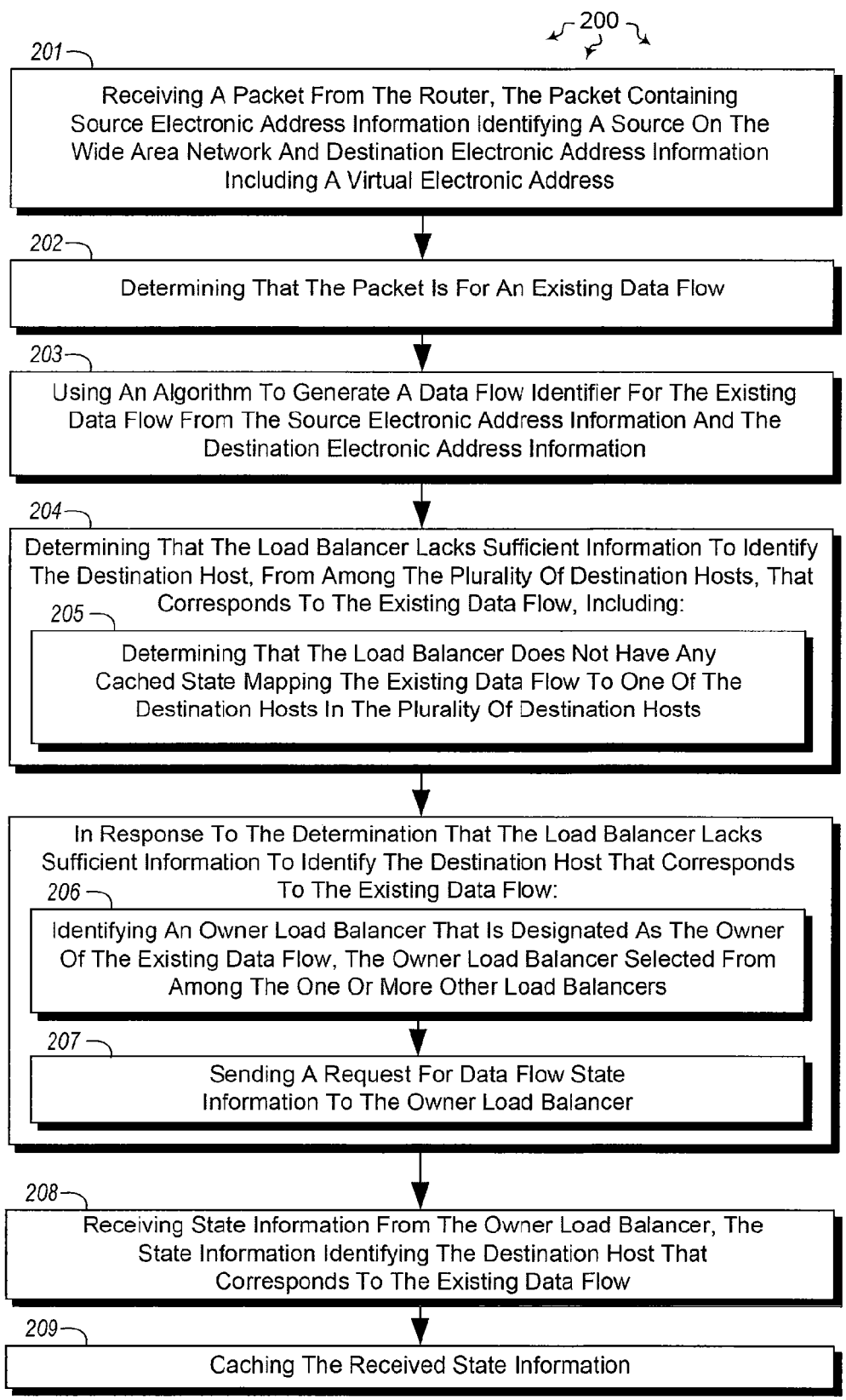
FIG. 2 illustrates a flow chart of an example method for sharing state between load balancers.

FIG. 2 illustrates a flow chart of an example method 200 for sharing state between load balancers. Method 200 will be described with respect to the components and data of computer architecture 100.

Method 200 includes an act of the load balancer receiving a packet from the router, the packet containing source electronic address information identifying a source on the wide area network and destination electronic address information including the virtual electronic address (act 201). For example, mux 106A can receive packet 121 from router 102. Packet 121 contains source (e.g., IP) address 122 identifying a source on network 101. Packet 121 also contains destination address 123. Destination address 123 can be a Virtual IP address used to contact destination hosts 107.

Method 200 includes an act of the load balancer determining that the packet is for an existing data flow (act 202). For example, mux 106 can determine that packet 121 is for an existing data flow. The first packet in a data flow (e.g., a SYN packet for Transmission Control Protocol, TCP, packets) can contain a first packet indicator. Other packets in the data flow (e.g., non-SYN packets for TCP) do not contain the first packet indicator. Thus, when a packet does not contain a first packet indicator, a mux can infer that the packet is for an existing data flow. Mux 106A can determine that packet 121 does not contain a first packet indicator. As such, much 106A infers that packet 121 is for an existing data flow.

Method 200 includes an act of the load balancer using an algorithm to generate a data flow identifier for the existing data flow from the source electronic address information and the destination electronic address information (act 203). For example, ID generator can use a hash function to hash source address 122 and destination address 123 into flow ID 144. Flow ID 144 can represent an index position, for example, of new array 109. For example, Flow ID 144 can represent the $4^{th}$ position in new array 109. In some embodiments, a hash algorithm is used to hash a source IP address and VIP into a data flow identifier.

Method 200 includes an act of load balancer determining that the load balancer lacks sufficient information to identify the destination host, from among the plurality of destination hosts, that corresponds to the existing data flow (act 204). For example, mux 106A can determine that mux 106A lacks sufficient information to identify the appropriate destination host, from among destination hosts 107, that corresponds to flow ID 144.

Act 204 can include an act of the load balancer determining that the load balancer does not have any cached state mapping the existing data flow to one of the destination hosts in the plurality of destination hosts (act 205). For example, state manager 143A can determine that mux 106A does not have any cached state mapping flow ID 144 to one of destination hosts 107. State manager 143A can refer to state 146A (cached state) to check for a destination host mapping for flow ID 144.

Act 204 can include an act of the load balancer detecting that the arrangement of the plurality of destination hosts is in a transition. For example, mux 106A can detect a transition in the arrangement of destination hosts 107. Destination host 107C can be added to destination hosts 107 during the lifetime of one or more existing data flows (e.g., flow ID 144). Destination array generator 104 can detect the change. In response, destination array generator 104 can generate new array 109. Mux 106A can refer to old array 108 and new array 109. As depicted at least by difference 111, mux 106A detects the transition. That is, a portion of the data flow ID space is now allocated to destination host 107C.

Method 200 includes in response to the determination that the load balancer lacks sufficient information to identify the destination host that corresponds to the existing data flow, an act of the load balancer identifying an owner load balancer that is designated as the owner of the existing data flow, the owner load balancer selected from among the one or more other load balancers (act 206). For example, mux 106A can identify mux 106B as the owner of flow ID 144. Owner detector 142A can receive flow ID 144 as input and output the IP address for mux 106B as the owner of flow ID 144.

In some embodiments, mux 106A uses a second hashing algorithm to hash source address 122 and destination address 123 into a second hash value. The second hash value represents an index position in an owner array (e.g., depicted in FIGS. 7A and 7B). The owner array maps data flows to corresponding owner muxes that maintain state for mapped data flows when a transition is detected. Thus, mux 106A can refer to an index position for flow ID 144 in an owner array to identify mux 106B as the owner of flow ID 144.

Load balancing manager 103 can monitor muxes 106 and adjust primary owner arrays and backup owner arrays for data flows as muxes are added and/or removed from muxes 106. Load balancing manager 103 can distribute ownership for data flows to (the extent possible) balance primary and backup ownership across muxes 106.

Method 200 also includes in response to the determination that the load balancer lacks sufficient information to identify the destination host that corresponds to the existing data flow, an act of the load balancer sending a request for data flow state information to the owner load balancer (act 207). For example, mux 106A can send packet 121 to mux 106B. Alternately, mux 106A can retain packet 121 and send an express request for data flow state information for flow ID 144 to mux 106B.

Mux 106B can receive packet 121 from mux 106A. Upon receiving packet 121, ID generator 141B can generate flow ID 144 from source address 122 and destination address 123. Owner detector 142B can then determine that mux 106B is the owner for flow ID 144. State manager 142B can refer to state 146B to access state 126. State 126 can map flow ID 144 to destination host 107B. If no state is found, mux 106B can generate new state 126 using the current destination array. Mux 106B can send packet 121 to destination host 107B. Mux 106B can return state 126 to mux 106A. Mux 106B can also send state 126 to backup owner corresponding to this flow.

Alternately, mux 106B can receive an express request for data flow state information for flow ID 144 from mux 106A. Owner detector 142B can determine that mux 106B is the owner for flow ID 144. State manager 142B can refer to state 146B to access state 126. Mux 106B can return state 126 to mux 106A.

Method 200 includes an act of the load balancer receiving state information from the owner load balancer, the state information identifying the destination host that corresponds to the existing data flow (act 208). For example, mux 106A can receive state 126 from mux 106B. Method 200 includes an act of the load balancer caching the received state information (act 209). For example, mux 106A can cache state 126 in state 146A. When mux 106A receives state 126 in response to an express request, mux 106A can then send packet 121 to destination host 107B.

Further, when subsequent packets for flow ID 144 are received (even if mux 106B sends packet 121 to destination host 107B), mux 106A can identify destination host 107B as the appropriate destination host for the subsequent packets. For example, mux 106A can receive packet 132. Packet 132 contains source address 122 and destination address 123. ID generator 141B can determine that packet 132 corresponds to flow ID 144. State manager 143B can refer to state 146A to identify that destination host 107B is the appropriate destination host for flow ID 144. Mux 106A can then send packet 132 to destination host 107B.

Other muxes can also receive packets for flow ID 144. If these other muxes have cached state for flow ID 144 (either self generated or queried from another mux) they can send packets onto destination host 107B. For example, mux 106C can receive packet 131. Packet 131 contains source address 122 and destination address 123. ID generator 141C can determine that packet 132 corresponds to flow ID 144. State manager 143C can refer to state 146C to identify that destination host 107B is the appropriate destination host for flow ID 144. Mux 106C can then send packet 131 to destination host 107B.

Further, when an arrangement of destination host is in a transition, muxes with state for existing data flows that have a different destination host in the old and new destination array can send the state to an owner mux for the data flows. For example, it may be that the addition of destination host 107C causes a transition in destination hosts 107. Upon detecting the transition mux 106C can have state for one or more existing data flows for which other muxes, such as, for example, mux 106A and/or mux 106B are owners. In response to detecting the transition, mux 106 can send state for existing data flows that have a different destination host in the old and new destination array to the appropriate owner mux. For example, mux 106C can send state for flow ID 144 to mux 106C (not shown). During a transition, appropriate owner muxes can receive state from other muxes. For example, mux 106A can receive state for flow ID 144 from mux 106C (not shown).

Figure 3:
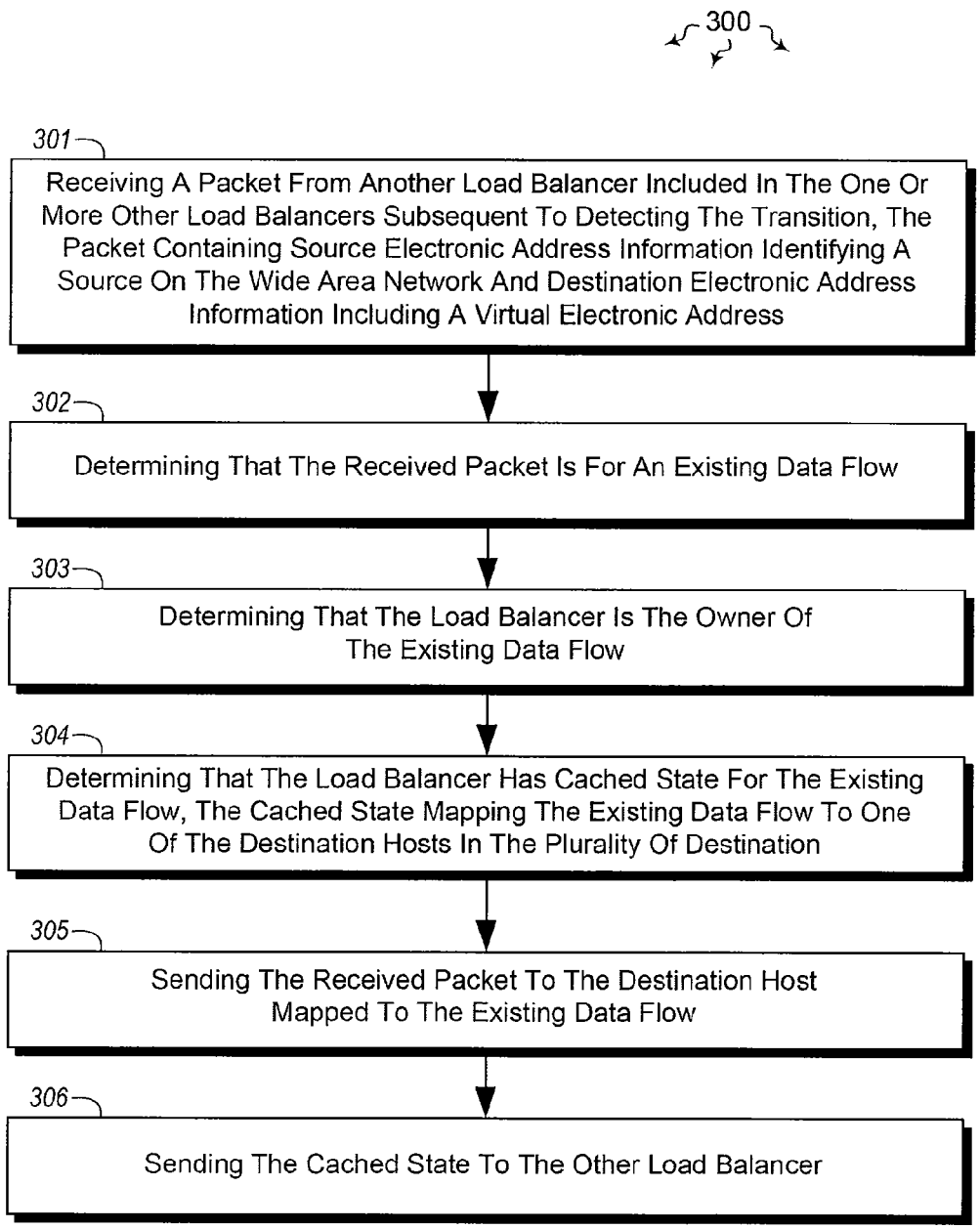
FIG. 3 illustrates a flow chart of an example method for sharing state between load balancers.

FIG. 3 illustrates a flow chart of an example method 300 for sharing state between load balancers. Method 300 will be described with respect to the components and data of computer architecture 100.

Method 300 includes an act of the load balancer receiving a packet from another load balancer included in the one or more other load balancers, the packet containing source electronic address information identifying a source on the wide area network and destination electronic address information including the virtual electronic address (act 301). For example, mux 106B can receive packet 121 from mux 106A. Method 300 includes an act of the load balancer determining that the received packet is for an existing data flow (act 302). For example, id generator 144 can determine that packet 121 corresponds to flow ID144. Method 300 includes an act of the load balancer determining that the load balancer is the owner of the existing data flow (act 302). For example, owner detector 142B can determine that mux 106B is the owner of flow ID 144.

Method 300 includes an act of the load balancer determining that the load balancer has cached state for the existing data flow, the cached state mapping the existing data flow to one of the destination hosts in the plurality of destination hosts (act 304). For example, state manager 142B can refer to state 146B to access state 126. State 126 can indicate that flow ID 144 corresponds to destination host 107B. Alternatively, state manager 142B can generate state 126.

Method 300 includes an act of the load balancer sending the received packet to the destination host mapped to the existing data flow (act 305). For example, mux 106B can send packet 121 to destination host 107B. Method 300 includes an act of load balancer sending the cached state to the other load balancer (act 306). For example, mux 106B can return state 126 to mux 106A.

Alternatively, mux 106B can receive an express request from mux 106A for state mapping flow ID 144 to an appropriate destination host 107. In response, state manager 142B can refer to state 146B to access state 126. State 126 can indicate that flow ID 144 corresponds to destination host 107B. Mux 106B can return state 126 to mux 106A. Mux 106A can then send packet 121 to destination host 107B based on the mapping in state 126.

Figure 4A:
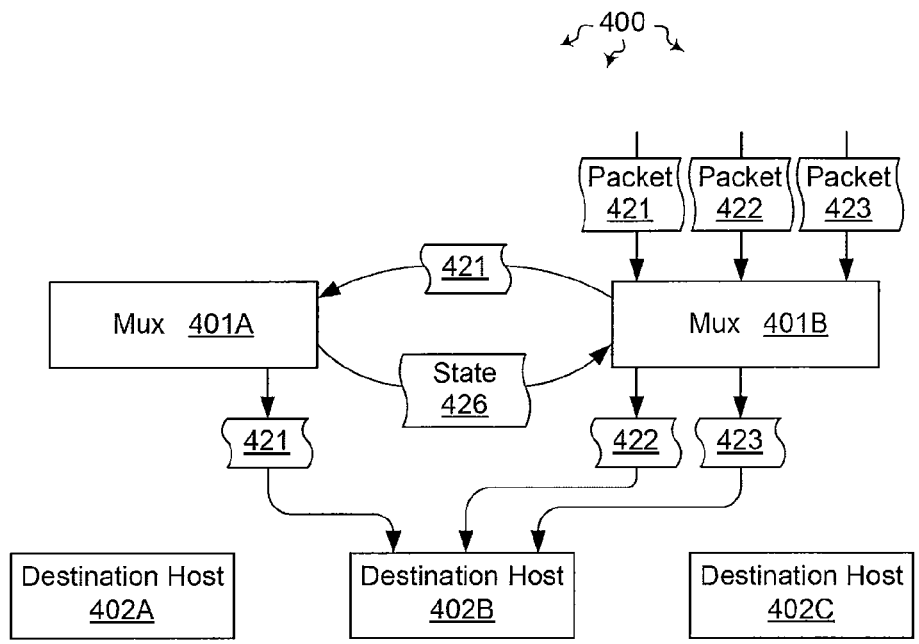
FIGS. 4A and 4B illustrate an example computer architecture for sharing state between muxes.
Figure 4B:
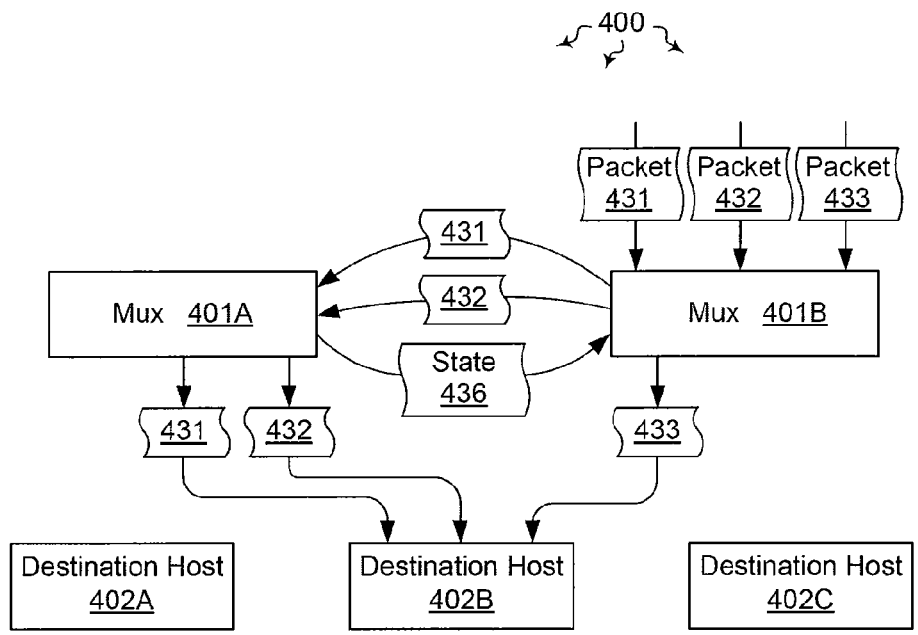

FIGS. 4A and 4B illustrate example computer architecture 400 for sharing state between muxes. As depicted, computer architecture 400 includes muxes 401A and 401B and destination hosts 402A, 402B, and 402C. In FIG. 4A, mux 401B receives packet 421. Mux 401B determines it lacks sufficient information to identify an appropriate destination host. In response, mux 401B sends packet 421 to mux 401A (an owner mux). Mux 401A receives packet 421 from mux 401B. Mux 401A identifies and returns state 426 to mux 401B. State 426 maps a data flow for packet 421 to destination host 402B. Mux 401A also forwards packet 421 to destination host 402B. Subsequently, mux 401B receives packets 422 and 423 for the same data flow as packet 421. Based on state 426, mux 401B sends packets 422 and 423 to destination host 402B.

In FIG. 4B, mux 401A receives packet 431. Mux 401B determines it lacks sufficient information to identify an appropriate destination host. In response, mux 401B sends packet 431 to mux 401A (an owner mux). Mux 401A receives packet 431 from mux 401B. Mux 401A identifies and returns state 436 to mux 401B. State 436 maps a data flow for packet 431 to destination host 402B. Mux 401A sends packet 431 to destination host 402B.

However, prior to receiving state 436, mux 401B receives packet 432 for the same data flow as packet 431. Since mux 401B has not yet received state 436, mux 401B determines it lacks sufficient information to identify an appropriate destination host. In response, mux 401B also sends packet 432 to mux 401A. Mux 401A receives packet 432 from mux 401B. Mux 401A determines that is has already sent state 436 to mux 401B. Mux 401A sends packet 432 to destination host 402B. Subsequently, mux 401B receives packet 433 for the same data flow as packet 431. Based on state 436, mux 401B sends packets 433 to destination host 402B. Accordingly, embodiments of the invention can compensate for delays in the exchange of state between muxes.

Figure 5A:
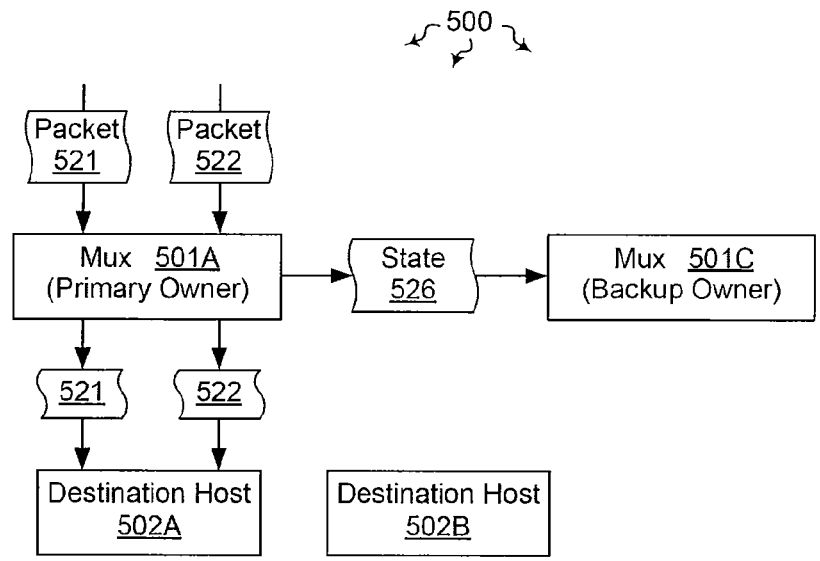
FIGS. 5A and 5B illustrate an example computer architecture for sharing state between muxes.
Figure 5B:
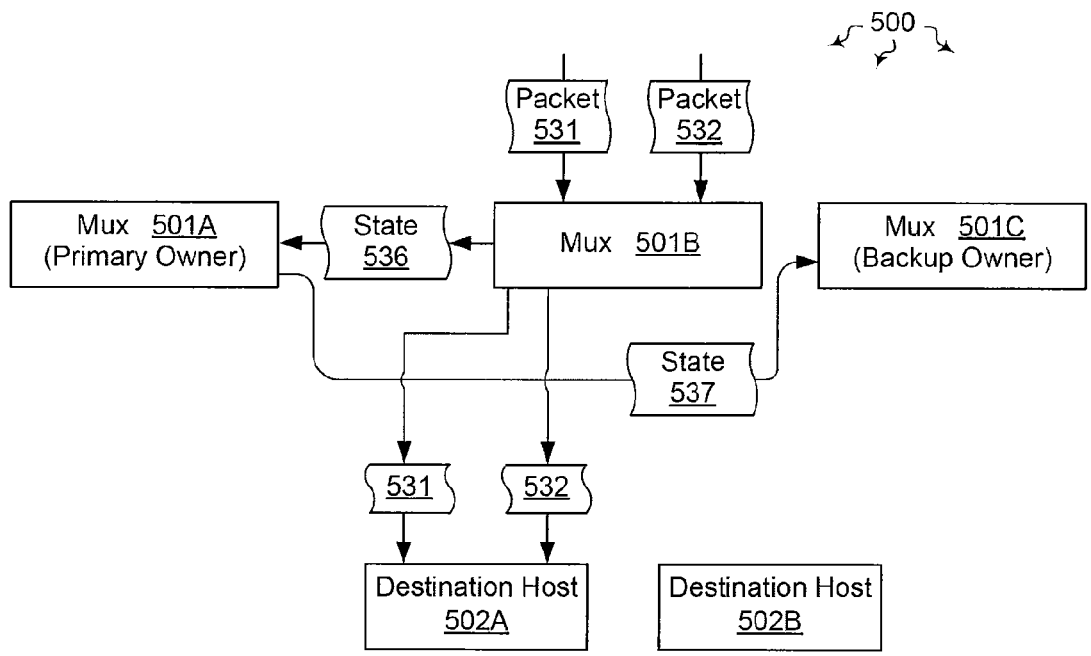

FIGS. 5A and 5B illustrate example computer architecture 500 for sharing state between muxes. As depicted, computer architecture 500 includes muxes 501A, 501B, and 501C and destination hosts 502A, 502B, and 502C.

In FIG. 5A, Mux 501A is the primary owner for an existing data flow including packets 521 and 522 (packets 521 and 522 are non-SYN packets). Mux 501C is a backup owner for the data flow including packets 521 and 522.

Mux 501A receives packet 521. Mux 501A determines that it is the owner of the existing data flow and that it lacks sufficient information to identify an appropriate destination host (i.e., mux 501A lacks cached state for the existing data flow). In response, mux 501A refers to the current destination array (e.g., new array 109) to identify the destination host 502A as the appropriate destination host. Mux 501A also begins to track state 526 for the existing data flow. Upon a subsequent transition and determination that state 526 is different from the new array, mux 501A sends state 526 to mux 501C. Mux 501C receives state 526 from mux 501A and caches state 526. State 526 maps the existing data flow to destination host 502A. Accordingly, if mux 501A fails, mux 501C can take over in providing state 526 to other muxes.

In FIG. 5B, Mux 501A is the primary owner for an existing data flow including packets 531 and 532 (packets 531 and 532 are non-SYN packets). Mux 501C is a backup owner for the data flow including packets 531 and 532.

Mux 501B receives packets 531 and 532. Mux 501B has sufficient information to determine that destination host 502A is the appropriate destination host for the existing data flow (i.e., it is either a new flow or the mux has cached information about the flow). Mux 501B also determines that mux 501A is the primary owner of the existing data flow. Upon a change in the destination array, mux 501B detects a transition and sends state 536 to mux 501A. Mux 501A receives state 536 from mux 501B. State 536 maps the existing data flow to destination host 502A.

If more packets belonging to the same flow keep arriving at Mux 501B, it keeps sending a batch update 538 (that includes state 536 and other states for which Mux 501A is the owner) to the owner mux 501A from time to time so that the owner mux always has the current information about all the flows it is the owner of.

From time to time, mux 501A can send batch state updates to other backup owners. For example, mux 501A can send state 537 to mux 501C. Mux 501C can receive state 537 from mux 501A. State 537 can be a batch of state updates (including state 536) for active flows being tracked by mux 501A.

Figure 6A:
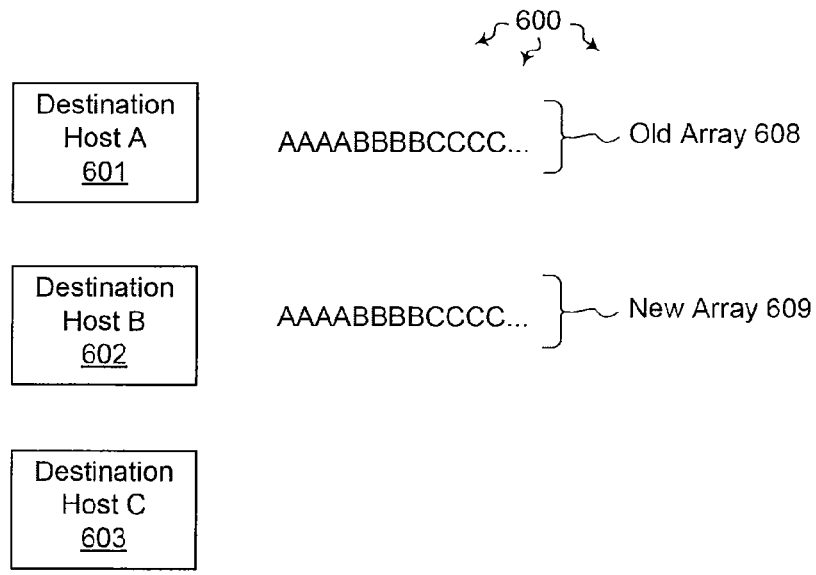
FIGS. 6A, 6B, 6C, and 6D illustrate an example computer architecture for maintaining data flow to destination host mappings.

FIGS. 6A, 6B, 6C, and 6D illustrate example computer architecture 600 for maintaining data flow to destination host mappings. FIG. 6A depicts an arrangement of destination host A 601, destination host B 602, and destination host C 603 in a steady state. Accordingly, old array 608 and new array 609 match one another. In a steady state, muxes can refer to an array to determine an appropriate destination host for a data flow.

Figure 6B:
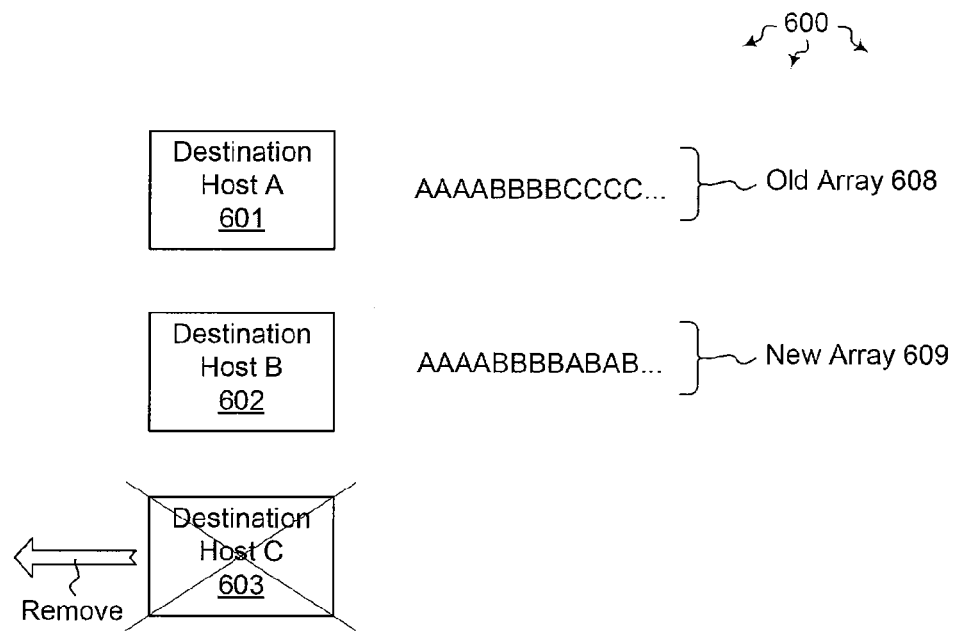

FIG. 6B depicts an arrangement of destination host A 601, destination host B 602, and destination host C 603, wherein destination host C 603 is removed. Removal of a destination host can be essentially instantaneous. As such, removal of a destination host does not necessary indicate a transition in the arrangement of destination hosts. Thus, upon removal of a destination host, muxes can still refer to an array to determine an appropriate destination host for a data flow.

Figure 6C:
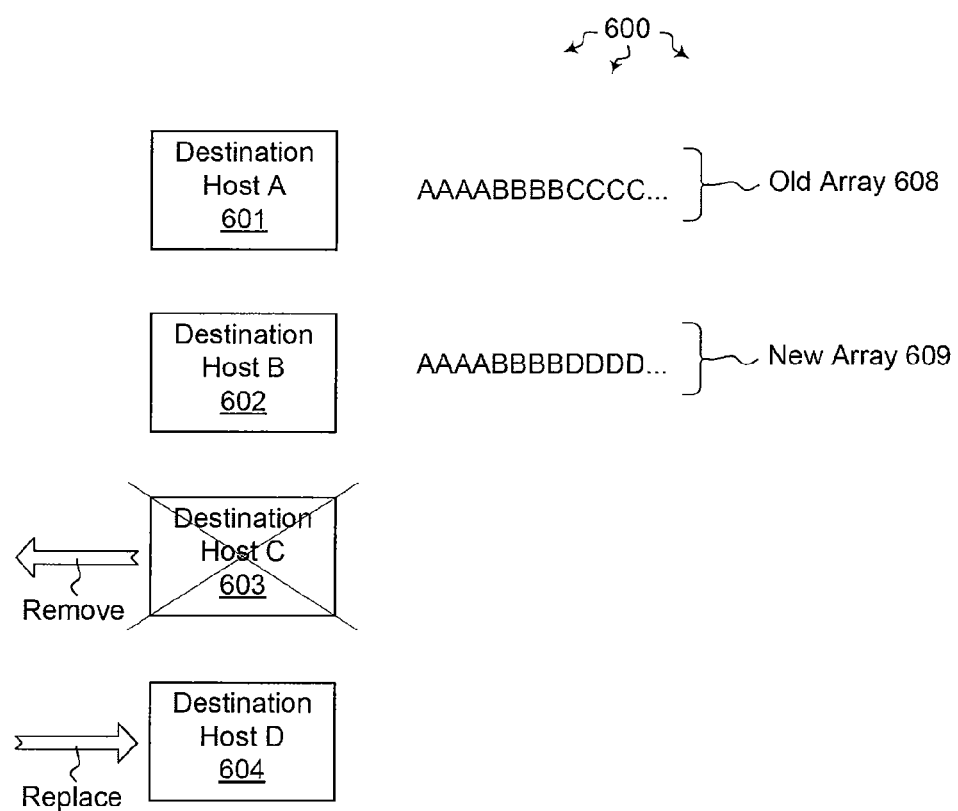

FIG. 6C depicts an arrangement of destination host A 601, destination host B 602, destination host C 603, and destination host D 604, wherein destination host C 603 is replaced with destination host D 604. Replacement of a destination host can also be essentially instantaneous. As such, replacement of a destination host does not necessary indicate a transition in the arrangement of destination hosts. Thus, upon replacement of a destination host, muxes can still refer to an array to determine an appropriate destination host for a data flow.

Figure 6D:
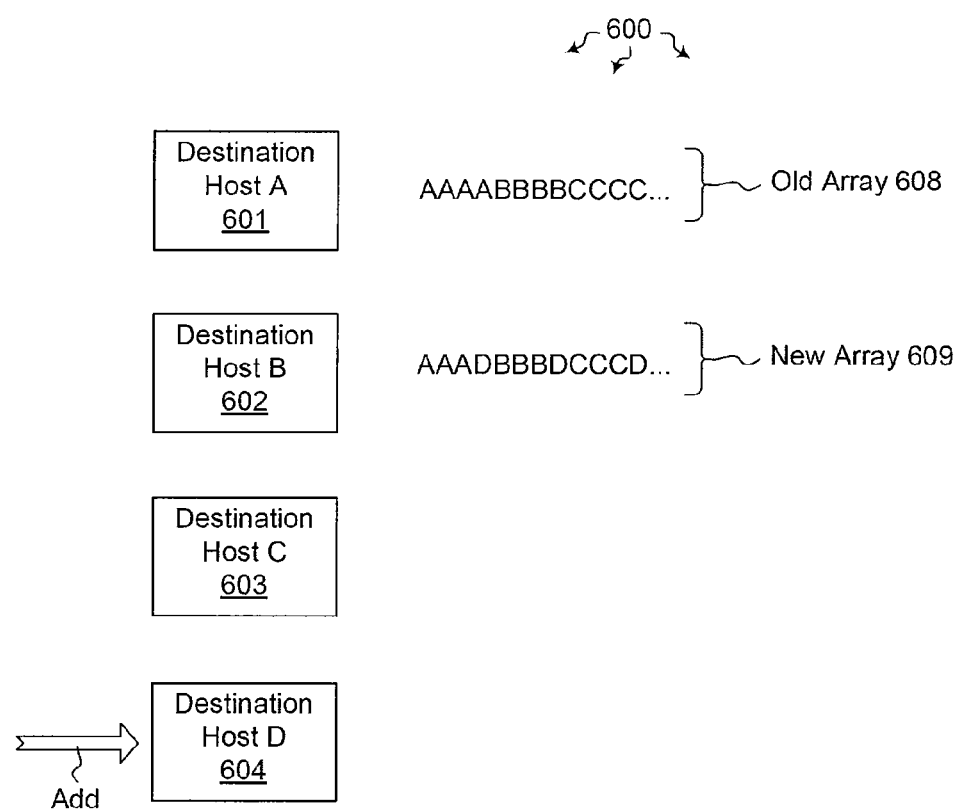

FIG. 6D depicts an arrangement of destination host A 601, destination host B 602, destination host C 603, and destination host D 604, wherein destination host D 603 is added. Addition of a destination host can include a transition period and thus a transition in the arrangement of destination hosts. During the transition period, mappings in old array 608 and new array 609 can differ (since some data flows are re-allocated to destination host D 604 to balance out workload). When different mappings are detected, muxes can track and exchange data flow state. When all the owner muxes have enough information to make decisions about the flows they own, the arrangement of destination hosts returns to a steady state and old array 608 and new array 609 match again.

Figure 7A:
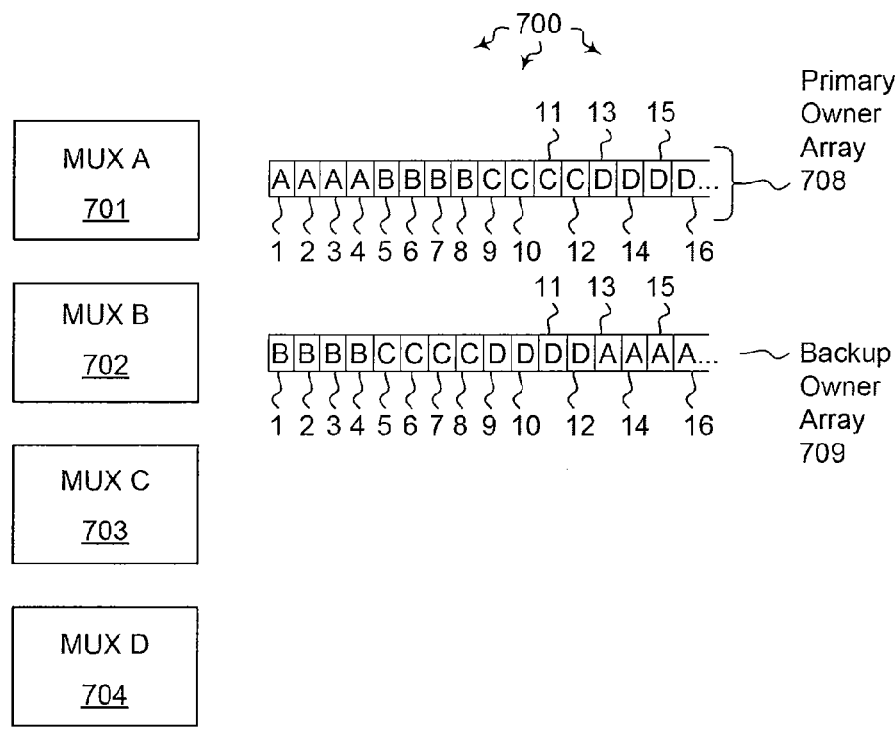
FIGS. 7A and 7B illustrate an example computer architecture for maintaining data flow to owner mux mappings.
Figure 7B:
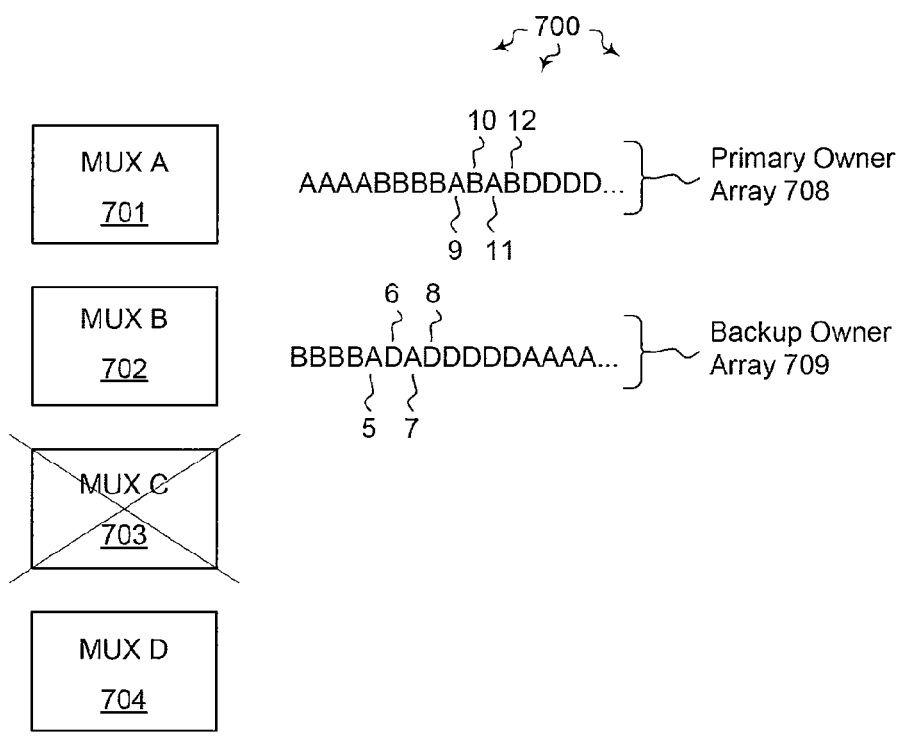

FIGS. 7A and 7B illustrate example computer architecture 700 for maintaining data flow to owner mux mappings. FIG. 7A depicts mux A 701, mux B 702, mux C 703, and mux D 704. Primary owner array 708 maps data flows to primary owner muxes. Backup owner array 709 maps data flows to backup owners muxes. The index position in an array can correspond to data flow ID. For example, the primary owner for data flow ID 6 is mux B 702. Similarly, a backup owner for data flow ID 6 is mux C 703. In some embodiments, an owner detector (e.g., 142A, 142B. 142C, etc.) uses a data flow ID as an index position into an array and sends state updates to the mux identified at the index position.

When a mux fails, primary and backup ownership responsibilities for the mux are re-allocated. FIG. 7B depicts a failure of mux C 703. In response to the failure, primary ownership for index positions (data flow IDs) 9-12 and backup ownership for index positions (data flow IDs) 5-8 are reallocated to remaining muxes.

Accordingly, embodiments of the invention include load balancers using a consistent hashing algorithm to decide how new connections should be load balanced. Use of consistent hashing algorithm permits load balancers to minimize the amount of state that needs to be exchanged. In particular, only flow states that cannot be determined using the hash and destination array need to be synchronized. Load balancers keep flow state information (destination address for a given flow) about incoming packets. When it is needed, i.e. such as, for example, when a change in destination host configuration is detected, selected state information is shared across load balancers in a deterministic way, which enables the authoritative (e.g., is the owner) load balancer to choose the correct destination host for a given flow. Each load balancer can reach the authoritative load balancer to learn about a flow that cannot be determined locally.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more computer hardware storage device having stored computer-executable instructions which, when executed by at least one computer hardware processor, cause a load balancer to implement a method that includes the following:
   monitoring a plurality of destination hosts for changes in an arrangement of the plurality of destination hosts;
   maintaining a destination host array that maps flow identifiers to destination hosts;
   prior to each array update, copying the destination host array to an old version of the destination host array;
   updating the destination host array at periodic intervals;
   providing the destination host array and the old version of the destination host array to a plurality of muxes;
   monitoring the plurality of muxes for changes;
   maintaining a primary ownership array mapping the flow identifiers to primary owner muxes;
   maintain a backup ownership array mapping the flow identifiers to backup owner muxes;
   providing the primary ownership array and the backup ownership array to the plurality of muxes;
   wherein each of the plurality of muxes is configured for:
   receiving packets from a router;
   formulating a flow identifier for each received packet based on information contained in the packet;
   identifying an appropriate destination host, from among the plurality of destination hosts, for the packet; and
   sending the packet to identified appropriate destination host.

2. The one or more computer hardware storage device recited in claim 1, wherein the identifying includes:
   determining if a data flow associated with the packet is a new data flow;
   when the data flow is determined to be an existing data flow, using the flow identifier as an index into the destination host array to identify the appropriate destination host for the packet;
   when the contents of the destination host array and the old version of the destination host array do not match, referring to cached state to identify the appropriate destination host for the packet, including:
      referring to cached state at the mux to determine if the mux previously cached an indication of the appropriate destination host for flow identifier, including:
         when the cached state at the mux contains an indication of the appropriate destination host for flow identifier, accessing the cached state at the mux; and
         when the cached state at the mux does not contain the appropriate destination host for flow identifier, referring to an owner array to identify an owner mux for the flow identifier;
         querying the identified owner mux for cached state; and
         receiving cached state, indicating the appropriate destination host for the flow identifier, from the identified owner mux.

3. The one or more computer hardware storage device of claim 2, wherein each of the plurality of muxes is further configured to:
   receive state for one or more other existing data flows from one or more other muxes, the one or more other muxes having determined the mux to be the primary owner mux for the one or more other existing data flows through reference to the primary ownership array.

4. The one or more computer hardware storage device of claim 3, wherein each of the plurality of muxes is further configured to:
   send state for further existing data flow to another mux, the mux having determined, through reference to the primary ownership array, that the other mux is the primary owner of the one or more other existing data flows.

5. The one or more computer hardware storage device of claim 2, wherein each of the plurality of muxes is further configured to:
   receive a batch of cached state for other existing data flows from another mux, the other mux balancer being the primary owner mux for the other existing data flows, the other mux having determined that the mux is a backup owner mux for the other existing data flows through reference to the backup ownership array.

6. The one or more computer hardware storage device of claim 2, wherein each of the plurality of muxes is further configured to:
   send a batch of cached state for further existing data flows to at least one backup owner mux, identified through reference to the backup ownership array, for caching at the backup owner mux.

7. A load balancing system, comprising:
   one or more processors;
   system memory;
   a router; and
   one or more computer storage devices having stored thereon computer-executable instructions representing a load balancing manager, a plurality of muxes, and a plurality of destination hosts, wherein the load balancer is configured to:
      monitor the plurality of destination hosts for changes in the arrangement of the plurality of destination hosts;
      maintain an destination host array mapping flow identifiers to destination hosts;
      prior to each array update, copy the destination host array to an old version of the destination host array;
      update the destination host array at periodic intervals;
      provide the destination host array and the old version of the destination host array to the plurality of muxes;
      monitor the plurality of muxes for changes;
      maintain a primary ownership array mapping flow identifiers to primary owner muxes;
      maintain a backup ownership array mapping flow identifiers to backup owner muxes;
      provide the primary ownership array and the backup ownership array to the plurality of muxes; and
   wherein each of the plurality of muxes are configured to:
      receive packets from a router;
      formulate a flow identifier for each received packet based on information contained in the packet;
      identify an appropriate destination host, from among the plurality of destination hosts, for the packet, including:
         determining if a data flow associated with the packet is a new data flow;

when the data flow is determined to be an existing data flow, using the flow identifier as an index into the destination host array to identify the appropriate destination host for the packet;

when the contents of the destination host array and the old version of the destination host array do not match, referring to cached state to identify the appropriate destination host for the packet, including:

referring to cached state at the mux to determine if the mux previously cached an indication of the appropriate destination host for flow identifier, including:

when the cached state at the mux contains an indication of the appropriate destination host for flow identifier, accessing the cached state at the mux; and when the cached state at the mux does not contain the appropriate destination host for flow identifier, referring to an owner array to identify an owner mux for the flow identifier;

querying the identified owner mux for cached state; and receiving cached state, indicating the appropriate destination host for the flow identifier, from the identified owner mux; and send the packet to identified appropriate destination host.

8. The load balancing system of claim 7, wherein each of the plurality of muxes is further configured to:

receive state for one or more other existing data flows from other muxes, the one or more other muxes having determined the mux to be the primary owner mux for the one or more other existing data flows through reference to the primary ownership array.

9. The load balancing system of claim 8, wherein each of the plurality of muxes is further configured to:

send state for further existing data flow to another mux, the mux having determined, through reference to the primary ownership array, that the other mux is the primary owner of the other existing data flow.

10. The load balancing system of claim 8, wherein each of the plurality of muxes is further configured to:

receive a batch of cached state for other existing data flows from another mux, the other mux balancer being the primary owner mux for the other existing data flows, the other mux having determined that the mux is a backup owner mux for the other existing data flows through reference to the backup ownership array.

11. The load balancing system of claim 10, wherein each of the plurality of muxes is further configured to:

send a batch of cached state for further existing data flows to at least one backup owner mux, identified through reference to the backup ownership array, for caching at the backup owner mux.

12. A computer-implemented method that includes the following being implemented by one or more computing systems:

monitoring a plurality of destination hosts for changes in an arrangement of the plurality of destination hosts;

maintaining a destination host array that maps flow identifiers to destination hosts;

prior to each array update, copying the destination host array to an old version of the destination host array;

updating the destination host array at periodic intervals;

providing the destination host array and the old version of the destination host array to a plurality of muxes;

monitoring the plurality of muxes for changes;

maintaining a primary ownership array mapping the flow identifiers to primary owner muxes;

maintain a backup ownership array mapping the flow identifiers to backup owner muxes; and providing the primary ownership array and the backup ownership array to the plurality of muxes.

13. The method of claim 12, wherein each of the plurality of muxes is configured for:

receiving packets from a router;

formulating a flow identifier for each received packet based on information contained in the packet;

identifying an appropriate destination host, from among the plurality of destination hosts, for the packet; and sending the packet to identified appropriate destination host.

14. The method of claim 13, wherein the identifying includes:

determining if the data flow is a new data flow or an existing data flow;

when the data flow is determined to be an existing data flow, using the flow identifier as an index into the destination host array to identify the appropriate destination host for the packet;

when the contents of the destination host array and the old version of the destination host array do not match, referring to cached state to identify the appropriate destination host for the packet, including:

referring to cached state at the mux to determine if the mux previously cached an indication of the appropriate destination host for flow identifier, including:

when the cached state at the mux contains an indication of the appropriate destination host for flow identifier, accessing the cached state at the mux.

15. The method of claim 13, wherein the identifying includes:

determining if the data flow is a new data flow or an existing data flow;

when the data flow is determined to be an existing data flow, using the flow identifier as an index into the destination host array to identify the appropriate destination host for the packet;

when the contents of the destination host array and the old version of the destination host array do not match, referring to cached state to identify the appropriate destination host for the packet, including:

referring to cached state at the mux to determine if the mux previously cached an indication of the appropriate destination host for flow identifier, including:

when the cached state at the mux does not contain the appropriate destination host for flow identifier, referring to an owner array to identify an owner mux for the flow identifier;

querying the identified owner mux for cached state; and receiving cached state, indicating the appropriate destination host for the flow identifier, from the identified owner mux.

16. The method of claim 12, wherein each of the plurality of muxes is further configured to:

receive state for one or more other existing data flows from one or more other muxes, the one or more other muxes having determined the mux to be the primary owner mux for the one or more other existing data flows through reference to the primary ownership array.

17. The method of claim 16, wherein each of the plurality of muxes is further configured to:
send state for further existing data flow to another mux, the mux having determined, through reference to the primary owner array, that the other mux is the primary ownership of the one or more other existing data flows.

18. The method of claim 12, wherein each of the plurality of muxes is further configured to:
receive a batch of cached state for other existing data flows from another mux, the other mux balancer being the primary owner mux for the other existing data flows, the other mux having determined that the mux is a backup owner mux for the other existing data flows through reference to the backup ownership array.

19. The method of claim 12, wherein each of the plurality of muxes is further configured to:
send a batch of cached state for further existing data flows to at least one backup owner mux, identified through reference to the backup ownership array, for caching at the backup owner mux.

20. The method of claim 12, wherein monitoring a plurality of destination hosts for changes includes monitoring for a failure.

\* \* \* \* \*